C. DAY.
GLASS DRAWING POT.
APPLICATION FILED JAN. 3, 1919.
1,333,903.
Patented Mar. 16, 1920.
2 SHEETS—SHEET 1.
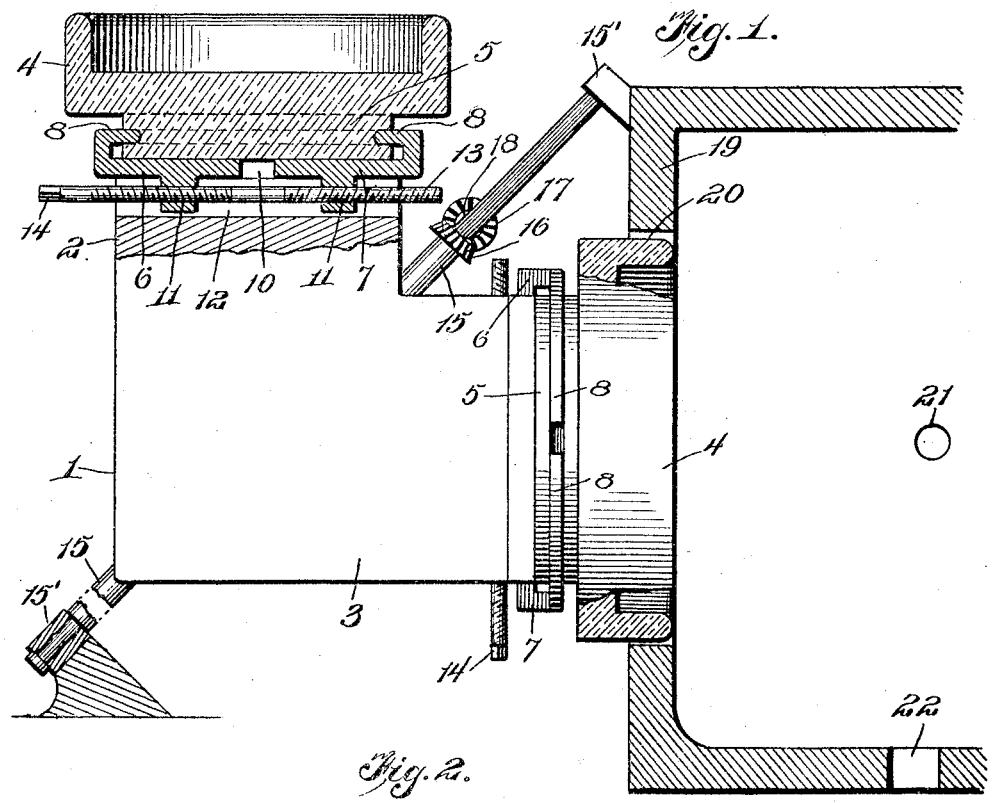
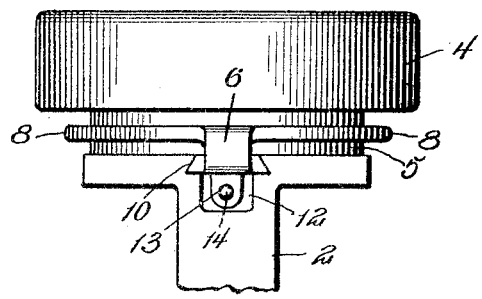
Inventor.
Charles Day
By C. C. Hines,
Attorney

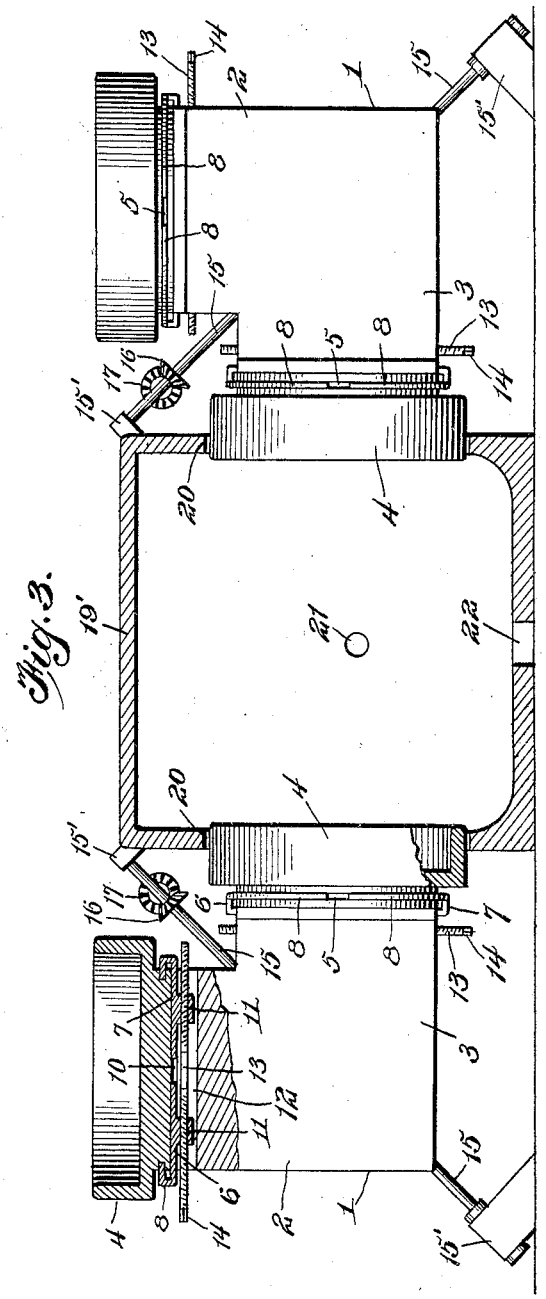

UNITED STATES PATENT OFFICE.

CHARLES DAY, OF OKMULGEE, OKLAHOMA, ASSIGNOR, BY MESNE ASSIGNMENTS, TO L. SHERMAN SKELTON, OF OKMULGEE, OKLAHOMA.

GLASS-DRAWING POT.

1,333,903. Specification of Letters Patent. Patented Mar. 16, 1920.

Application filed January 3, 1919. Serial No. 269,494.

*To all whom it may concern:*

Be it known that I, CHARLES DAY, a citizen of the United States, residing at Okmulgee, in the county of Okmulgee and State of Oklahoma, have invented new and useful Improvements in Glass-Drawing Pots, of which the following is a specification.

This invention relates to glass drawing pots of the type employed in drawing glass cylinders for the production of window glass, etc., and particularly to pots of that kind mounted for movement between a drawing position and a draining position, in which draining position the aftermath or refuse glass is melted for discharge.

One object of the invention is to provide a pot which is mounted on an axis set at such angle as to adapt the pot to be moved from a normal horizontal drawing position to a vertical draining position.

A further object of the invention is to provide a double pot, in which the pot vessels are arranged at an angle to each other, and which double pot is mounted upon an axis of the character described, so that when one pot is in drawing position the other will be in draining position, and vice versa.

A still further object of the invention is to provide a pot which is mounted wholly upon the exterior of the furnace employed for melting out the aftermath, whereby the melting of the pot and its charge of glass will be facilitated and overheating of the pot prevented.

A still further object of the invention is to provide a pot construction whereby a plurality of pot devices may be used in conjunction with a single draining furnace.

The invention consists of the features of construction, combination and arrangement of parts hereinafter fully described and claimed, reference being had to the accompanying drawing, in which:—

Figure 1 is a view in side elevation, partially in vertical section, of a double drawing pot embodying my invention, showing one of the pot vessels arranged in drawing position and the other pot vessel arranged in draining position within the mouth or opening in a furnace.

Fig. 2 is a view in elevation of one of the pot vessels and a portion of the frame, looking in a direction at right angles to that shown in Fig. 1.

Fig. 3 is a section showing pot devices at two drawing stations arranged for use with a single draining furnace.

In the practical embodiment of my invention in a double pot construction, I provide a suitable pot supporting frame 1 having arms or portions 2 and 3 arranged at right angles to each other. These arms are provided each with an outer seat face to support a pot receptacle 4, made of fire-clay or other suitable refractory material, and which is provided with a cavity of suitable size to receive a charge of glass for the drawing of a cylinder or other article. The pot may be of any suitable shape, but is provided with a preferably circular base portion 5 arranged to seat upon a pair of clamping members 6 and 7 having segmental clamping jaws 8 projecting into the annular groove of the base 5 and thus clamping and detachably holding the pot in position upon the frame arms. The jaws 6 and 7 are of dove-tailed formation to slide in a dove-tailed guideway 10 formed in the seat face of the frame arm, and said jaws are provided with suitable portions having threaded openings 11 and which are movable in a passage or recess 12 formed in the frame arm and intersecting the guideway 10. The openings 11 are preferably threaded for engagement with the right and left hand threaded ends of a screw shaft 13 extending through the passage 12 and having an angular end 14 for the reception of a crank handle or the like, whereby said shaft may be revolved in one direction or the other. It is apparent that by the construction described the clamping devices may be adjusted toward or from each other to clamp or release the pot, so that in case of damage or injury to one pot another may be substituted therefor and readily and conveniently clamped in position for use.

The frame 1 is mounted to swing or turn or completely revolve upon an axis 15, which may consist of a continuous shaft or stud shaft sections journaled in suitable bearings 15', one end of the shaft or one of the stud shaft sections being provided with a gear 16 meshing with a gear 17 on a shaft 18 which may be operated by any suitable means to transmit power to the pot frame to swing the same through an arc of 180°, or through such an arc as to move one pot section from a normal horizontal to a vertical position, or vice versa. It will be observed that the shaft or axis 15 extends diagonally across the frame 1 along the plane of intersection of its arms 2 and 3, and that the arrangement is such that the shaft or axis is set at an angle of 45° to the horizontal, so that in the movement of either frame arm through an arc of 180° the frame arm will shift from an upright or vertical position to a horizontal position, or vice versa. While I have shown the embodiment of the invention in a double pot construction, wherein the arrangement is such that when one pot is in drawing or working position the other will be in draining position, for convenience and time-saving in the drawing of cylinders or other articles, it will be of course understood that when desired the principle may be applied to a single pot construction, whenever it is desired to mount the pot for movement outside of a furnace and for swinging movement between a horizontal drawing position and a vertical draining position. It will also be understood that instead of swinging or tilting the frame to move each pot back and forth through an arc of 180°, alternately between drawing and draining positions, the same result may be obtained by revolving the frame in one (either) direction in each cycle of operation a half revolution at a time, and this action is contemplated by and falls within the spirit and scope of my invention.

In the illustrated disclosure I have shown the pot arranged wholly outside a melting furnace 19, one of the vertical walls only of which is illustrated in Fig. 1, which wall is provided with a mouth or receiving opening 20 of proper shape and size to receive the pot which is at the time being in draining position. It will be observed that the shaft or axis 15 is inclined at an oblique angle to this furnace wall, and hence the shaft is set at an angle of 45° with respect to each pot member and to the furnace wall. Hence when either pot member 4 is moved, after a draw, from the drawing position to the draining position, the arc of movement will be such that the pot will shift from a horizontal to a vertical position and into the mouth or opening 20 of the furnace 19. In such position its cavity will face the interior of the furnace and hence will be subjected to the internal heat of the furnace or the flames from one or more burners 21 therein, whereby the aftermath will be melted out and drained by gravity from the pot into the bottom of the furnace. The melted aftermath may discharge through an outlet 22 in the bottom of the furnace into a cellar or other suitable receptacle, to be gathered up and returned to a melting furnace from which molten glass is to be successively supplied to the pots as they are brought into drawing position for succeeding draws.

In Fig. 1 I have fragmentarily shown a furnace construction which may be provided with an opening 20 in one side wall only for coöperation with a pot construction of the type described at a single drawing station only, in which event a melting furnace will be provided for each double pot device, but, as illustrated in Fig. 3, the furnace 19' may be provided in two of its opposite side walls with openings 20 for coöperation with pot devices at two drawing stations, one at each side of the furnace, thus making a single melting kiln or furnace serve for two pairs or sets of pot devices. In a similar manner the number of pots employed in conjunction with a single furnace may be increased or multiplied, dependent upon the form of the furnace and other conditions, and it will, of course, be understood that the heating means may be varied in volume and arrangement accordingly.

It is to be understood, of course, that the invention is not limited to any particular means for detachably mounting the pots upon their supporting frame, or to the number of pots used although two pots are preferably employed, or to any particular construction of the frame, the structure being susceptible of wide modifications without departing from the principle of the invention involved. It will be observed that the pot when in drawing position is arranged wholly upon the exterior of the furnace. Hence the pot will be exposed substantially on all sides to the cooling effects of the atmosphere, whereby the temperature of the glass will be reduced with proper rapidity to facilitate the draw or speed of the draw. As each pot is provided with a thickened base, it will be understood that this will retain sufficient heat to keep the body of glass at the proper temperature for the draw and prevent the glass from chilling with undue rapidity.

My invention differs radically from so-called reversible pots of that type in which the pot is movable from an upper horizontal drawing position to an opposite or lower horizontal draining position, in which draining position the pot is arranged above a source of heat in a furnace. Such reversible pots are objectionable for the reason that the pot which is in working position is exposed to the heat from the furnace, resulting in the retardation of the cooling of the glass and an objectionable retardation in the drawing operation. Moreover, the pot, being thus subjected to the heat from the furnace, is liable to cause overheating of the glass, particularly the glass remaining at or near the end of the draw, with the result of causing so-called "hot pot blisters" or "whole end blisters" or other similar defects, resulting in the drawing of an imperfect cylinder. As with my construction the pot is wholly removed when in drawing position from the heat of the furnace, these objections are entirely overcome and the drawing of glass cylinders of better quality insured.

Having thus fully described my invention, I claim:—

1. A glass drawing pot mounted for movement upon an axis inclined at an angle of 45° to the horizontal from a horizontal drawing position to a vertical draining position.

2. A glass drawing pot movably mounted on an axis inclined to the horizontal from a horizontal drawing position to a vertical draining position, and vice versa.

3. A glass drawing pot movably mounted upon a shaft inclined at an angle of 45° to the horizontal for movement from a horizontal drawing position to a vertical draining position.

4. In combination, a stationary furnace having a vertical wall with a mouth or opening therein, and a drawing pot mounted externally of said furnace, said pot being movable upon an axis inclined to the horizontal from a horizontal drawing position to a vertical draining position, in which draining position the pot is disposed for coöperation with said mouth or opening in the stationary furnace.

5. A drawing pot comprising a pair of pot receptacles arranged at an angle of 90° to each other, and a support upon which said receptacles are mounted to turn upon a common axis inclined at an angle of less than 90° to the horizontal for movement from a horizontal drawing position to a vertical draining position, and vice versa.

6. A drawing pot comprising a frame having arms at right angles to each other, pots supported by said frame arms and arranged at corresponding angles, and an axial support extending along the line of intersection of the frame arms at an angle of 45° to the horizontal, for supporting the pot for movement through an arc to adapt each pot receptacle to be moved from a horizontal drawing position to a vertical draining position.

7. The combination with a furnace having a vertical wall provided with a mouth or opening, of a frame arranged in proximity thereto and upon the exterior thereof, said frame having arms arranged at right angles to each other, pot receptacles carried by said arms and arranged at a similar angle, and an axial support for the frame on which said frame is mounted to swing to successively move each pot from a horizontal drawing position to a vertical draining position for coöperation with the mouth of the furnace.

8. A drawing device comprising a pair of pot members arranged substantially at an angle of 90° to each other, said pot members being mounted for movement on a common axis arranged substantially at an angle of 45° to each pot.

9. A drawing device comprising a frame, pot receptacles mounted upon said frame substantially at an angle of 90° to each other, and an axis inclined substantially at an angle of 45° to the horizontal and to said pot receptacles and on which said frame is mounted to turn to move the receptacles between drawing and draining positions.

In testimony whereof I affix my signature.

CHARLES DAY.